(12) United States Patent
Vergara

(10) Patent No.: US 8,006,818 B2
(45) Date of Patent: Aug. 30, 2011

(54) TRANSMISSION ARRANGEMENT

(75) Inventor: Daniel Vergara, Madrid (ES)

(73) Assignee: Deere & Company, Moline, IL (US)

( * ) Notice: Subject to any disclaimer, the term of this patent is extended or adjusted under 35 U.S.C. 154(b) by 362 days.

(21) Appl. No.: 12/257,838

(22) Filed: Oct. 24, 2008

(65) Prior Publication Data

US 2009/0266669 A1   Oct. 29, 2009

(30) Foreign Application Priority Data

Oct. 26, 2007 (DE) .......................... 10 2007 051 244

(51) Int. Cl.
*F16D 67/04* (2006.01)
(52) U.S. Cl. .................................... 192/18 A; 192/12 B
(58) Field of Classification Search .................. None
See application file for complete search history.

(56) References Cited

U.S. PATENT DOCUMENTS

2007/0093352 A1* 4/2007 Hikada et al. ................. 475/331
2008/0214313 A1* 9/2008 Jaeger ............................ 464/38

FOREIGN PATENT DOCUMENTS

| DE | 601 15 717 | 3/2001 |
|----|-----------|--------|
| EP | 12 45 426 | 3/2002 |
| EP | 1186458 A2 | 3/2002 |
| FR | 2899157 A1 | 10/2007 |
| GB | 2278897 A | 12/1994 |

OTHER PUBLICATIONS

European Search Report received Jul. 27, 2010 (4 pages).
German Search Report, Jun. 6, 2008, 4 Pages.

* cited by examiner

*Primary Examiner* — David D Le
*Assistant Examiner* — Jacob S Scott

(57) ABSTRACT

A transmission arrangement has a transmission housing, an output shaft for driving an implement, a drive component for driving the output shaft, a clutch arranged between the output shaft and the drive component for transmitting a torque, a brake device for braking or locking the output shaft in relation to the transmission housing, an annular piston which is supported so that it is axially displaceable on the output shaft and which in a first position serves to actuate the clutch and in a second position actuates the brake device, and a freewheel device, which allows the output shaft to be rotated over a limited part of its circumference whilst in a locked state.

6 Claims, 3 Drawing Sheets

TRANSMISSION ARRANGEMENT

FIELD OF THE INVENTION

The invention relates to a transmission arrangement, particularly for a power take-off transmission, comprising a transmission housing, an output shaft for driving an implement, a drive component for driving the output shaft, a clutch arranged between the output shaft and the drive component for transmitting a torque, a brake device for locking the output shaft in relation to the transmission housing, an annular piston which is supported so that it is axially displaceable on the output shaft and which in a first position serves to actuate the clutch and in a second position actuates the brake device, and a freewheel device, which allows the output shaft to be rotated over a limited part of its circumference whilst in its locked state.

BACKGROUND OF THE INVENTION

Transmission arrangements are known, which comprise an output shaft, which can be locked by means of a brake device. Such transmission arrangements are used, for example, for power take-off transmissions on agricultural tractors, the output shaft constituting a so-called power take-off shaft (PTO), which serves to operate an implement hitched to the tractor. For safety reasons an implement must be connected to the power take-off shaft only when the power take-off shaft is locked. However, the toothing on the power take-off shaft often does not coincide with the internal toothing on the implement to be connected, so it is necessary to turn the power take-off shaft in order to be able to connect the implement. A freewheel device ensures that the power take-off shaft can, to a certain extent, be turned even whilst in its locked state, in order to facilitate the connection of the implement to the power take-off shaft. In the state of the art such freewheel devices take the form of freewheel balls, which form an axial closure between the output shaft and the brake device and which are each supported in axial segmental depressions or axially formed segmental channels, the depressions extending only over a certain section of the circumference of the output shaft, for example over a total of 60 degrees of the circumference. Here a segmental depression, in each case concentric with the output shaft, is formed on a transmission housing wall over a circumferential section of 30 degrees and an opposing segmental depression is formed over a circumferential section of 30 degrees on a brake disk connected to the brake device for the output shaft, so that the freewheel balls are each enclosed by two axially formed and opposing segmental depressions or channels, and the brake disk is axially fixed and radially moveable. If the brake disk is then braked or locked, the brake disk, which is connected to the output shaft, can still be turned to the extent that the freewheel balls are free to roll within the depressions or channels. When one of the freewheel balls reaches one end of a depression or channel, the maximum freewheeling extent (60 degrees of the circumference of the output shaft) is reached and the brake disk locks in one direction. The brake disk can then be turned in the opposite direction (by up to 60 degrees of the circumference of the output shaft), until the freewheel balls reach the opposite end of the depression or channel. During the braking sequence the brake disk is axially loaded and engages with a brake element. The axial force exerted in this process is absorbed by the freewheel balls or is transmitted by the latter to the housing wall or to the brake device. Owing to the spherical geometry here, the force is transmitted only at one isolated point, which can lead to peak stresses and unfavorable force distributions, and ultimately to the appearance of wear phenomena on the balls and depressions or channels, or to damaging of the transmission arrangement. Such a freewheel device is furthermore of complex design construction and is cost-intensive due to the number of different parts required.

SUMMARY OF THE INVENTION

The object of the invention is therefore to specify a transmission arrangement of the type stated in the introduction, which will overcome some or all of the aforementioned problems.

The invention herein provides for a transmission arrangement of the aforementioned type having a freewheel device, which comprises at least one freewheel element, which is arranged radially in relation to the output shaft between the output shaft and the annular piston and which is firmly connected to the output shaft or to the annular piston and extends radially into at least one recess, formed on the annular piston and/or on the drive shaft and extending over a limited part of the circumference. The fact that at least one freewheel element extends radially into the at least one formed recess means that a radial closure is formed between the output shaft and the annular piston irrespective of the axial forces exerted on the brake device, so that the axial forces exerted on the brake device cannot be transmitted by the freewheel device. At least one freewheel element can furthermore be formed with a geometry other that a spherical geometry, so that unfavorable peak stresses can be prevented even in the transmission of radial forces. The wear sustained by the freewheel device and the brake device is reduced due to the more favorable stress ratios. The fixed attachment of at least one freewheel element to the output shaft or to the annular piston facilitates assembly of the transmission arrangement and allows economic pre-assembly of the output shaft. Furthermore, the manufacturing process is not hampered by the costly introduction or forming of channels with spherically curved surface, thereby affording cost savings.

At least one freewheel element is preferably embodied as a disk, a part of the disk projecting radially into the recess and a part of the disk being firmly connected to the output shaft or to the annular piston. The disk may be connected to the drive shaft or to the annular piston in a press-fit by means of a corresponding recess, for example, a part of the circumference of the disk protruding radially beyond the outer circumference of the output shaft and/or the inner circumference of the annular piston and extending into the recess formed on the annular piston and/or on the output shaft. The recess formed on the output shaft and/or the annular piston is preferably made by an annular groove in the form of a radial depression, which is introduced over a part of the circumference, for example over 60 degrees. The geometry of a disk having a cross section with an angular contour obviates the need to form costly spherical surfaces, depressions having cross sections with an angular contour instead being suitable. Embodying the freewheel element as a disk allows force to be transmitted along a contact line, thereby affording a better distribution of stresses than in the case of transmission at an isolated point. The contact line may be varied here by the thickness of the disk. Instead of the disk, some other geometry may also be selected for the freewheel element. For example, a pin or bolt of cylindrical or cubic shape and fitting into corresponding recesses may also be used as freewheel element. From a functional point of view it is also feasible to use a ball as freewheel element.

At least three freewheel elements are preferably distributed over the outer circumference of the output shaft, and three cavities are accordingly formed on an inner circumference of the annular piston. This affords a uniform distribution of forces over the entire circumference. It is also possible to provide more or fewer than three freewheel elements and cavities. For freewheeling over a 60 degrees circumference the depressions forming the cavities are made over a segmental angle of 60 degrees. For freewheeling over 40 degrees or 70 degrees the depressions would have to extend accordingly over 40 degrees or 70 degrees. Corresponding freewheel arrangements with other (greater or smaller) segmental angles are naturally also feasible.

The annular piston is preferably embodied as a brake piston, in such a way that in a braking position it can be brought into engagement with a brake element connected to the transmission housing, so that the output shaft can be locked in relation to the transmission housing. For this purpose a type of brake surface in the form of an annular brake lining, which is pressed against a brake element, which likewise has a brake lining in the form of an annular surface and is connected to the transmission housing, may be formed on the annular piston. The brake element may here be formed directly on a part of the transmission housing, for example on a transmission housing wall, or may otherwise be firmly connected as a component to the transmission housing, so that the annular piston is displaced axial in the direction of this transmission housing wall, in order to enter into braking engagement with the brake element. The output shaft is thereby braked and locked in relation to the transmission housing wall. It is also feasible to provide other formations on the annular piston and the transmission which will exert a braking action on the output shaft. For example, it is also possible to use a radially acting shoe brake, which acts on a brake surface applied externally to the annular piston, for example. Other types of brakes are also feasible; which serve to brake a rotational movement of the annular piston and to lock the latter.

The annular piston is preferably embodied as a clutch piston, in such a way that in a clutch position it can be brought into engagement with a clutch element connected to the clutch, so that the output shaft can be coupled to the drive component. For this purpose a rim, collar, step or projection, which engages with plates of a plate clutch, for example, may be formed on the side of the annular piston opposite the brake lining. Axial movement of the annular piston (in the opposite direction to an axial movement of the annular piston for a braking action) will then cause the plates to be pressed together, thereby transmitting a clutch torque or drive torque from the drive component to the output shaft. Many different types of clutches may be used, a coupling sequence being initiated by axial movement of the annular piston.

At least one spring element, which serves to bias the annular piston towards the brake element, is preferably arranged between the annular piston and the output shaft. This ensures that when no axial force is being applied in order to move the annular piston into a clutch position, the annular piston always remains in the braking position and that the output shaft is always braked or locked. Disk springs or Woodruff keys, which are arranged between a step on the output shaft and a step on the annular piston, are particularly suitable as spring element. It is also possible, however, to use helical or spiral coil springs distributed over the circumference, which apply the necessary spring force and keep the annular piston in the braking position.

A hydraulic chamber is preferably formed on the annular piston, in such a way that under pressurization of the hydraulic chamber the annular piston is axially displaceable and is brought into engagement with the clutch element through axial displacement, for example. The chamber is preferably formed by a first radially extending wall, which is formed, for example, by a disk axially fixed on the output shaft, by a second radially extending wall, which is preferably formed by an end face of the annular piston opposite the first wall, and by axially extending radial boundaries afforded by the output shaft and the annular piston or the disk. Filling of the chamber causes the first wall to be axially distanced from the second wall and the annular piston to move axially away from the disk. At the same time, the spring element can be compressed and the annular piston can be shifted from its braking position into the clutch position. An intermediate position is also possible here, when the hydraulic chamber is only filled sufficiently for abandonment of the braking position (spring element is slightly compressed) but not yet sufficiently for attainment of the clutch position (plates are not yet pressed together).

BRIEF DESCRIPTION OF THE DRAWINGS

The invention and further advantages and advantageous developments and embodiments of the invention will be described and explained in more detail with reference to the accompanying drawings, which show an exemplary embodiment of the invention wherein.

DESCRIPTION OF THE PREFERRED EMBODIMENT

Figure 1:
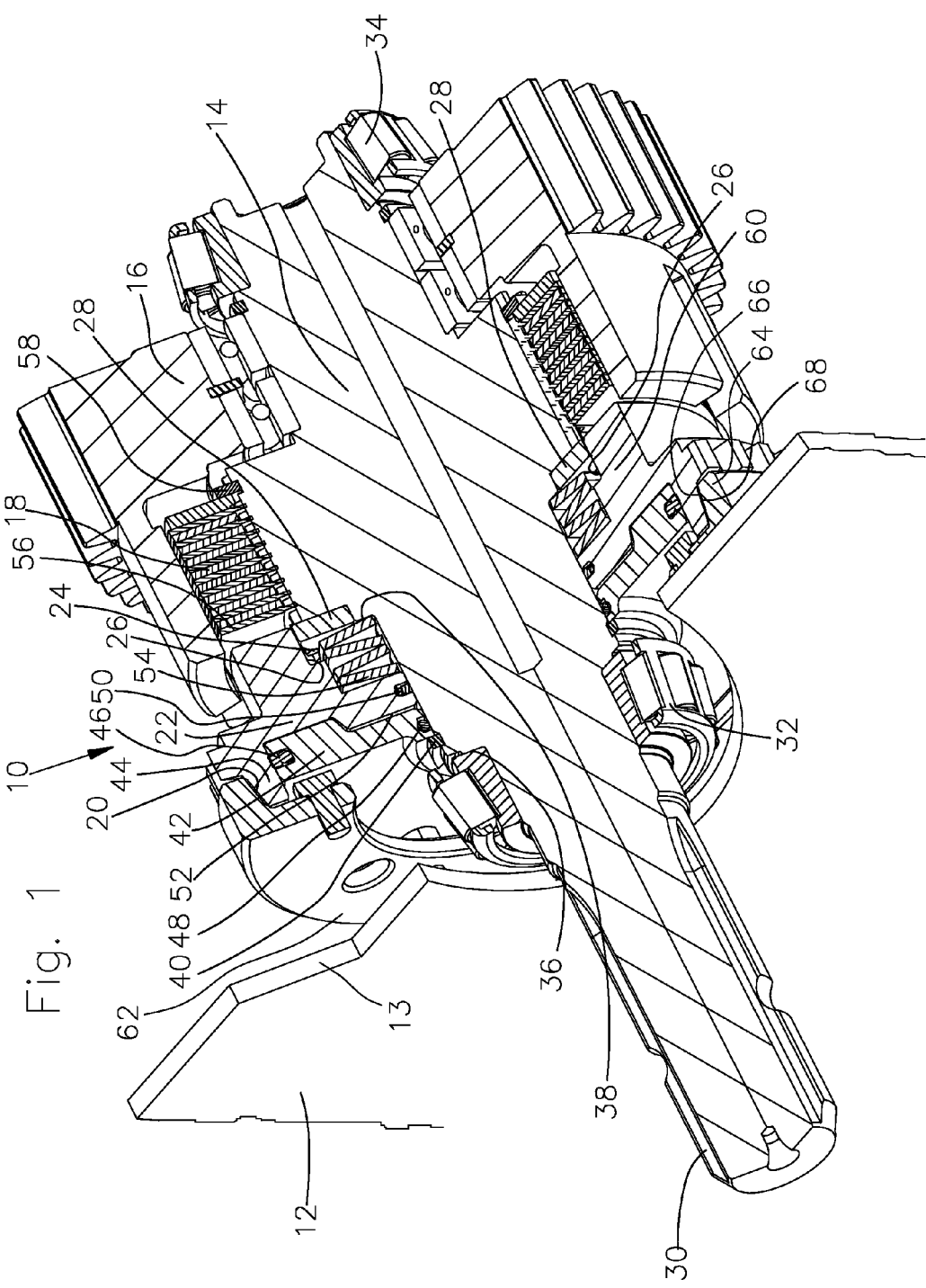
FIG. 1 shows a perspective, partially cross sectional view of a transmission arrangement according to the invention.

A transmission arrangement 10 is represented in FIG. 1 for a power take-off transmission of an agricultural tractor, for example, comprises a transmission housing 12 with a transmission housing wall 13, an output shaft 14 embodied as a power take-off shaft, a drive component 16 embodied as a gear shaft, a clutch 18 arranged between the output shaft 14 and the drive component 16, a brake device 20 and an annular piston 22 arranged between the clutch 18 and the brake device 20.

The annular piston is supported so that it is axially displaceable on the output shaft and is rotationally connected to the output shaft 14 by a freewheel device 24. The annular piston 22 therefore serves as torque transmission between the output shaft 14 and the drive element 16 and between the output shaft 14 and the brake device 20, as will be explained in more detail later.

Figure 2:
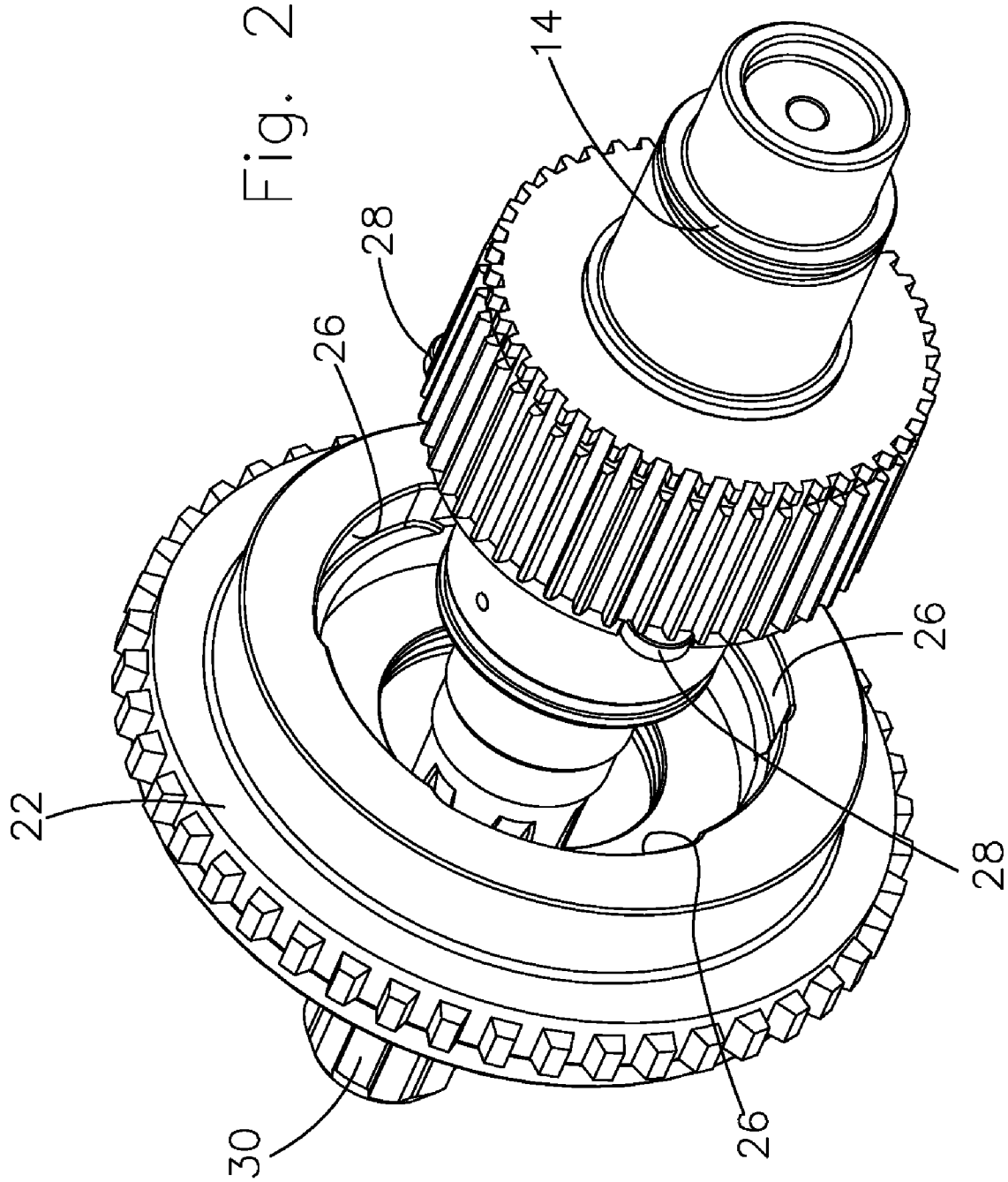
FIG. 2 shows a first side view in the form of an exploded drawing of the output shaft in FIG. 1 with freewheel elements; and, FIG. 3 shows a second side view in the form of an exploded drawing of the output shaft in FIG. 1 with freewheel elements and an annular piston.
Figure 3:
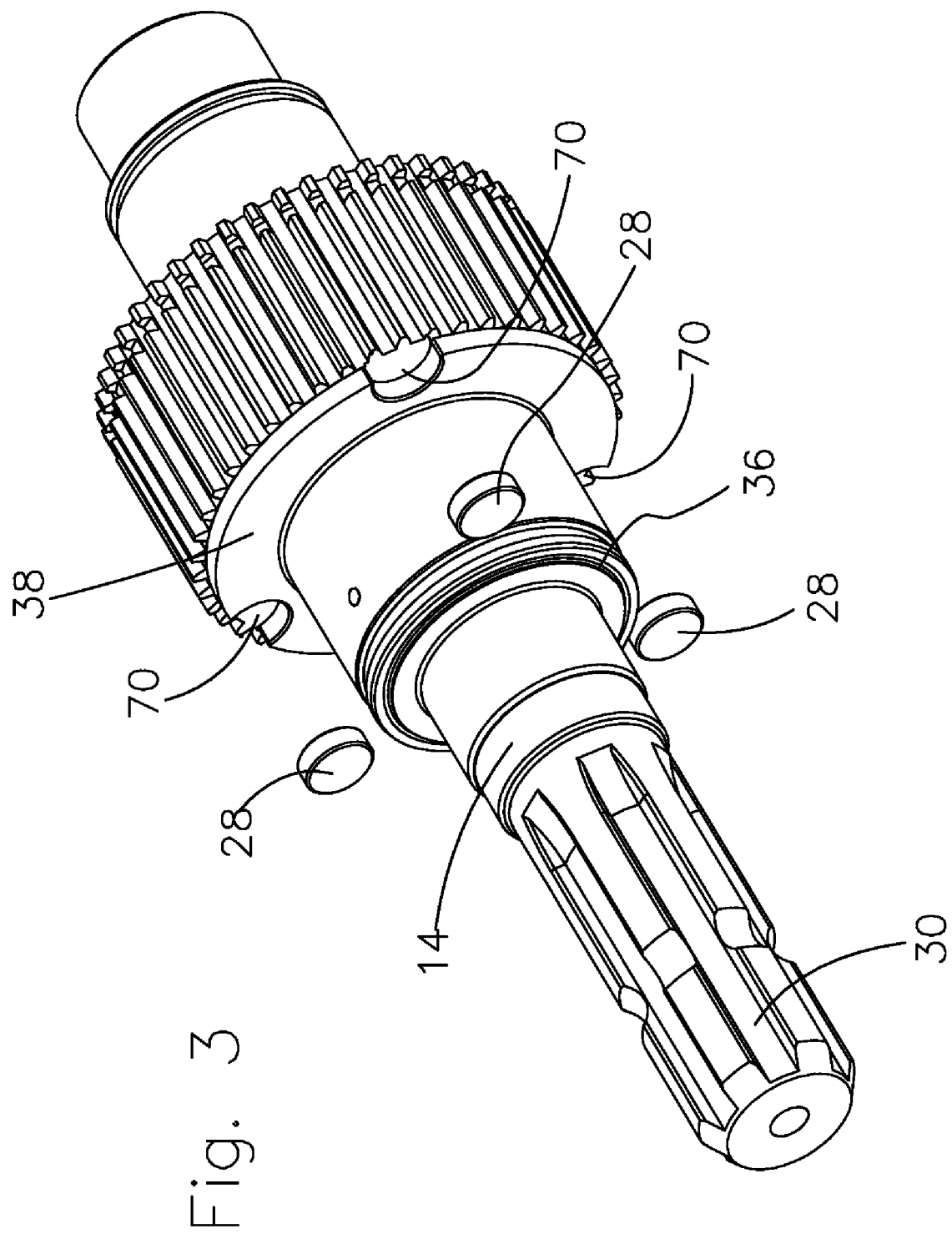

The freewheel device 24 is formed by a recesses 26 formed on the annular piston 22 and by freewheel elements 28 fixed to the output shaft 14, as can be seen, in particular, from FIGS. 2 and 3. Torque is transmitted between the annular piston 22 and the output shaft as soon as the freewheel elements 28 reach one of the ends of the recesses 26 and carry the annular piston 22 in the circumferential direction and in the direction of rotation of the output shaft 14.

The output shaft 14 embodied as a power take-off shaft has teeth 30 at one free end for driving a mounted or towed implement (not shown). The output shaft 14 is supported on the transmission housing wall 13 by a first bearing 32. A second bearing 34 serves to support the output shaft 14 inside the transmission housing 12. The output shaft is provided with a first step 36 and a second step 38, the first bearing 32 being arranged adjoining the first step.

A disk 42, which is axially secured by a retainer ring 40 and adjoining which is the annular piston 22, axially displaceable on the output shaft 14, is arranged between the first step 36 and the second step 38. A guide rim 44, which extends axially in the direction of the transmission housing wall 13, and which radially encloses the disk 42 and is axially guided by the latter, is formed on the annular piston 22. A sealing ring 46, which radially seals off the disk 42 from the guide rim 44, is arranged between the guide rim 44 and the disk 42. Arranged between the output shaft 14 and the disk 42 is a further sealing ring 48, which radially seals off the disk 42 from the output shaft 14. The disk 42 is supported inside the guide rim 44 in such a way that it can perform a relative axial movement in relation to the annular piston 22. The annular piston 22 is radially sealed off from the output shaft 14 by a further sealing ring 50. A hydraulic chamber 52, which is defined by an end face of disk 42 facing the annular piston 22, by an end face of the annular piston 22 facing the disk 42, by the circumferential surface of the output shaft 14 and by the radially inward-facing guide face of the guide rim 44, is formed between the disk 42 and the annular piston 22.

As can be seen from FIG. 1, the annular piston 22 is arranged so that it is axially displaceable between the disk 42 and the second step 38. A spring element 54 in the form of a disk spring, which biases the annular piston 22 in the direction of the disk 42 and presses the annular piston 22 against the disk 42, is arranged between the annular piston 22 and the second step 38. Clutch elements 56 in the form of output shaft-side and drive component-side plates, which are axially secured on the output shaft by a retainer ring 58, are arranged on the second step 38. A rim 60 extending axially in the direction of the clutch elements 58 is formed on the annular piston 22.

The brake device 20 has a flange 62 fixed to the transmission housing wall 13. The flange 62 has a brake rim 64, which radially encloses a radially outward-facing side of the guide rim 44. A radially inward-facing first brake surface 66 is formed on the brake rim 64. The radially outward-facing side of the guide rim 44 is provided with a second brake surface 68. Both brake surfaces 66, 68 are formed slightly tapering, so that a frictional contact is established or interrupted by axial displacement of the annular piston 22 in relation to the flange 62.

As can be seen from FIGS. 2 and 3, the freewheel elements 28 are embodied as disks, which are connected to the output shaft 14 by way of recesses 70 on a face formed by the second step 38. The freewheel elements 28 are preferably firmly seated by a press fit in the recesses 70. A part of the freewheel elements 28 embodied as disks protrudes radially beyond the edge of the second step 38, the recesses 26 formed on the annular piston 22 precisely accommodating this part of the freewheel elements 28. The recesses are here formed on the radially inward side of the rim 60 and in the assembled state form a cavity defined radially and in the circumferential direction of the output shaft 14, the parts of the freewheel elements 28 protruding beyond the edge of the second step 38 extending into the cavity. The recesses 26 are arranged symmetrically over a circumference of 60 degrees, three recesses 26 being provided, into each of which a freewheel element 28 extends. Altogether therefore three freewheel elements 28 are distributed over the circumference. The number of freewheel elements 28 and recesses 26 is variable and in the exemplary embodiment shown here is limited to three. At the end of each recess 26 the freewheel elements 28 circumferentially butt against the wall of the rim 60, so that a force closure is established between the annular piston 22 and the output shaft 14 in a circumferential direction. According to the direction of force closure, a drive torque from the drive component 16 or a braking torque or locking torque from the brake device 22 can thus be transmitted to the output shaft 14.

The operating principle of the transmission arrangement 10 and in particular that of the freewheel device 24 will now be described below.

Filling of the hydraulic chamber 52 causes the annular piston 22 to move in the direction of the clutch 18, the annular piston 22 being embodied as a clutch piston by virtue of the rim 60 formed on the side facing the clutch. On the side facing the brake device 20 the annular piston 22 is embodied as a brake piston by virtue of the brake rim 60 formed. Three different operating states can occur depending on the actuation of the annular piston 22, a braking or locking state, a clutch state and an idling state. A braking state is automatically assumed as soon as pressure in the hydraulic chamber is relieved. Under the biasing force of the spring element 54, the annular piston 22 is pressed in the direction of the brake device 20, so that the brake surfaces 66, 68 enter into frictional contact and brake or lock the annular piston in relation to the transmission housing 12. In this braking state the annular piston 22 is locked, as therefore also is the output shaft 14, rotationally locked to the annular piston 22. If the hydraulic chamber 52 is filled or pressurized with hydraulic fluid, on the other hand, the annular piston 22 moves against the biasing force of the spring element 54 in the direction of the clutch 18, so that the brake surfaces 66, 68 release their frictional contact. In this state the annular piston 22 is connected neither to the brake device 20 nor to the clutch 18, so that the annular piston 22 is free to rotate. The output shaft is thereby also free to rotate and is situated in an idling state. This idling state is abandoned as soon as the annular piston 22 is moved further in the direction of the clutch 18, due to further filling of the hydraulic chamber 52 or further pressurization, and the rim 60 formed on the annular piston 22 comes into engagement with the clutch elements 56 and presses these together, so that a clutch frictional contact occurs between the output shaft-side plates and the drive component-side plates. In this clutch state torques can be transmitted from the drive component 16 to the output shaft 14.

Although, as described above, the freewheel device 24 serves as torque-transmitting component between the annular piston 22 and the drive shaft 14, in the braking state or in the locked state it acts as a freewheel device 24. In this operating state the annular piston 22 is locked and in turn brakes or locks the output shaft 14 via the freewheel elements 28, which butt against the ends of the recesses 26. The output shaft 14 can be turned, however, within the confines of the recesses 26 or to the extent that the freewheel elements 28 are free to move within the cavities formed by the recesses 26. Thus in the present exemplary embodiment the output shaft 14 can be turned by 60 degrees in one direction, since the recesses 26 extend over a segmental section of 60 degrees and the freewheel elements 28 are correspondingly free to move over a rotational angle of 60 degrees, until they butt against the opposing end of a recess 26 and establish a force closure or lock. Equally, the output shaft 14 can be turned back by 60 degrees in the opposite direction until the freewheel elements 28 again butt against the other end of the recesses 26 and establish a force closure or lock. The freewheel angle may be varied according to the formation of the recesses (in this case a 60 degrees segmental angle).

Although the invention has been described solely with reference to one exemplary embodiment, many different alternatives, modifications and variants falling with the scope of the present invention will be disclosed to the person skilled in the art in the light of the preceding description and the drawings.

The invention claimed is:

1. A transmission arrangement, comprising a transmission housing, an output shaft for driving an implement, a drive component for driving the output shaft, a clutch arranged between the output shaft and the drive component for transmitting a torque, a brake device for braking the output shaft in relation to the transmission housing, an annular piston supported so that it is axially displaceable on the output shaft and in a first position serves to actuate the clutch and in a second position actuates the brake device, and a freewheel device, which allows the output shaft to be rotated over a limited part of its circumference while in a locked state, wherein the freewheel device, comprises at least one freewheel element, which is arranged radially in relation to the output shaft between the output shaft and the annular piston and which is firmly connected to one of the output shaft and the annular piston and extends radially into at least one recess, formed on one of the annular piston and the drive shaft and extending over a limited part of the circumference, the at least one freewheel element being embodied as a disk, a part of the disk projecting radially into the recess and a part of the disk being firmly connected to one of the output shaft and the annular piston.

2. The transmission arrangement according to claim 1, wherein at least three freewheel elements are distributed over an outer circumference of the output shaft, and three recesses are formed on an inner circumference of the annular piston.

3. The transmission arrangement according to claim 1, wherein the annular piston is embodied as a brake piston and can be brought into engagement with a brake element connected to the transmission housing, the output shaft then being lockable in relation to the transmission housing.

4. The transmission arrangement according to claim 1, wherein the annular piston is embodied as a clutch piston and can be brought into engagement with a clutch element connected to the clutch, in order to one of drive-connect and couple the output shaft to the drive component.

5. The transmission arrangement according to claim 3, wherein at least one spring element, which serves to bias the annular piston towards the brake element, is arranged between the annular piston and the output shaft.

6. The transmission arrangement according to claim 4, wherein a hydraulic chamber is formed on the annular piston, in such a way that under a pressurization of the hydraulic chamber the annular piston is axially displaceable.

* * * * *